(12) United States Patent
Tsuchino et al.

(10) Patent No.: US 6,389,156 B1
(45) Date of Patent: May 14, 2002

(54) METHOD AND APPARATUS FOR READING RADIOGRAPHIC IMAGES

(75) Inventors: Hisanori Tsuchino; Tomoko Saito, both of Hino (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 09/162,433

(22) Filed: Sep. 28, 1998

(30) Foreign Application Priority Data

Oct. 9, 1997 (JP) ............................................... 9-277307

(51) Int. Cl.$^7$ ................................................ G06K 9/00
(52) U.S. Cl. ........................ 382/132; 128/922; 382/128
(58) Field of Search ............................... 382/132, 128; 250/584, 588, 582; 128/922

(56) References Cited

U.S. PATENT DOCUMENTS

| | | | | |
|---|---|---|---|---|
| 4,740,699 A | * | 4/1988 | Minura et al. ............... 250/327 |
| 4,947,046 A | * | 8/1990 | Kawabata et al. ........... 250/484 |
| 5,055,681 A | * | 10/1991 | Tsuchino et al. ............ 250/327 |
| 5,173,609 A | * | 12/1992 | Lacoste et al. .............. 250/370 |
| 5,231,572 A | * | 7/1993 | Shigyo et al. ............... 364/413 |
| 5,260,573 A | * | 11/1993 | Tsuchino ..................... 250/584 |
| 5,283,736 A | * | 2/1994 | Nagatsuka et al. .......... 364/413 |
| 5,319,719 A | * | 6/1994 | Nakazawa et al. ............. 382/6 |
| 5,432,354 A | * | 7/1995 | Ohara ......................... 250/582 |
| 5,644,649 A | * | 7/1997 | Schoeteres et al. .......... 382/132 |
| 5,760,416 A | * | 6/1998 | Tsuchiya ..................... 250/584 |
| 5,786,994 A | * | 7/1998 | Friz et al. ................... 364/184 |
| 5,877,504 A | * | 3/1999 | Yanagita et al. ............. 250/484 |
| 5,889,283 A | * | 3/1999 | Yanagita et al. ............. 250/484 |
| 5,956,408 A | * | 9/1999 | Arnold ......................... 380/49 |

FOREIGN PATENT DOCUMENTS

WO    WO 91/04469   *   4/1991   ............. G01J/1/02

* cited by examiner

Primary Examiner—Leo Boudreau
Assistant Examiner—M. B. Choobin
(74) Attorney, Agent, or Firm—Frishauf, Holtz, Goodman, Langer & Chick, P.C.

(57) ABSTRACT

In a radiographic image reading method of reading a radiographic image on a radiographic image conversion panel and for obtaining radiographic image information; the adiographic image reading method includes steps of: reading panel discriminating information corresponding to the radiographic image conversion panel, thereby obtaining information regarding the radiographic image conversion panel; and applying image processing for the radiographic image information based on the information regarding the radiographic image conversion panel.

22 Claims, 9 Drawing Sheets

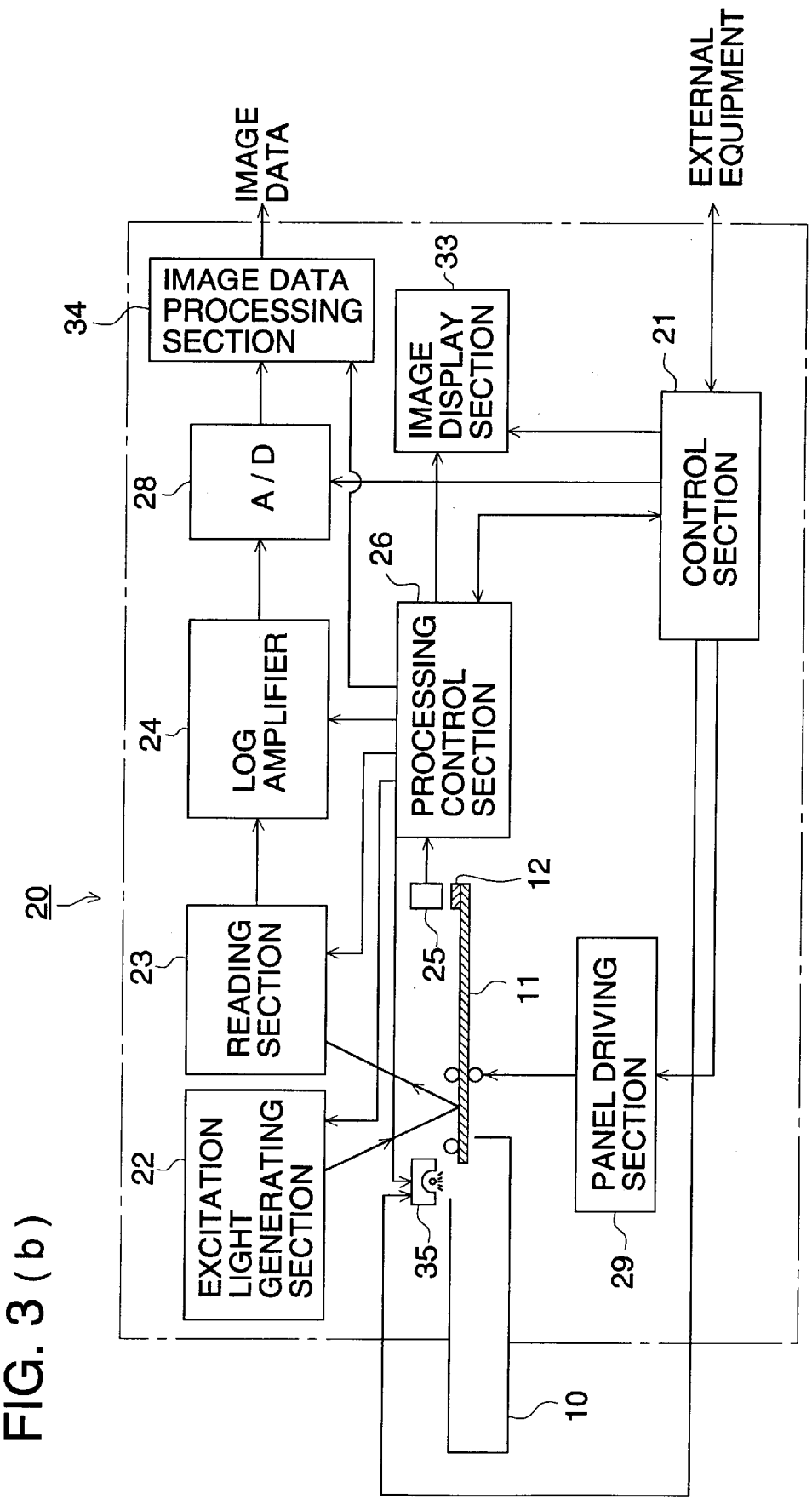

METHOD AND APPARATUS FOR READING RADIOGRAPHIC IMAGES

BACKGROUND OF THE INVENTION

The present invention relates to a radiographic image reading method employing a radiographic image conversion panel such as an accumulative phosphor (stimulating phosphor plate) and to a radiographic image reading apparatus.

When radioactive rays (X-rays, α-rays, beta rays, gamma rays and ultraviolet rays) are applied to a phosphor of a certain type, a part of the radiation energy is accumulated in the phosphor. It has been known that when an excitation light such as a visible light is applied to a phosphor, the phosphor emits light through stimulation in accordance with energy accumulated in the phosphor. A phosphor indicating this property is called an accumulative phosphor or a stimulative phosphor.

By utilizing this stimulative phosphor, it is possible to record temporarily radiographic image information of the human body on an accumulative phosphor (a radiographic image conversion panel) provided on a sheet, then to scan the radiographic image conversion panel with an excitation light such as a laser beam so that a stimulated emission light may be generated, and to read photoelectrically the stimulated emission light thus generated to obtain image signals.

Incidentally, the radiographic image conversion panel is not controlled strictly in terms of its sensitivity. Namely, even in the case of radiographic image conversion panels under the same brand, they delicately differ in terms of sensitivity, depending on the date of production.

In the case of an apparatus wherein a radiographic image conversion panel is housed in a cassette for radiographing and reading, in particular, it can happen that new and old radiographic image conversion panels each having different sensitivity are housed in the same cassette.

In this case, a signal value of the radiographic image is used by a radiographer to judge whether a level of the dose of irradiation is high or low. Therefore, when the signal value varies depending on the radiographic image conversion panel, it is impossible to judge or control the level of the dose of irradiation.

Further, when radiographing for plural radiographic images under the condition that radiographic image conversion panels each having different sensitivity are present as a mixture, radiographic images each having a different signal value are obtained, although the same subject is radiographed under the same dose of X-rays. Therefore, it is difficult to make a correct diagnosis.

SUMMARY OF THE INVENTION

The invention has been achieved to solve the aforesaid problem, and its object is to realize a radiographic image reading method and a radiographic image reading apparatus which make it possible to obtain the constant signal value for the constant dose of X-rays, independently of sensitivity of the radiographic image-conversion panel.

Methods and structures for solving the aforesaid problems will be explained as follows.

(1) A radiographic image reading method of reading a radiographic image on a radiographic image conversion panel and for obtaining radiographic image information; comprising steps of:
   reading panel discriminating information corresponding to the radiographic image conversion panel, thereby obtaining information regarding the radiographic image conversion panel; and
   applying image processing for the radiographic image information based on the information regarding the radiographic image conversion panel.

(2) A radiographic image reading apparatus, comprising:
   image reading means for reading a radiographic image on a radiographic image conversion panel and for obtaining radiographic image information;
   panel discriminating information reading means for reading panel discriminating information corresponding to the radiographic image conversion panel and for obtaining information regarding the radiographic image conversion panel;
   image processing means for applying image processing for the radiographic image information; and
   control means for controlling the image processing means so as to apply the image processing for the radiographic image information on the basis of the information regarding the radiographic image conversion panel.

With the invention described in Items (1) and (2), since image processing can be applied to radiographic image information in accordance with a radiographic image conversion panel, the radiographic image information more suitable for diagnosis can be obtained.

Further, since the image processing conformable to the characteristics of the radiographic image conversion panel, such as the sensitivity of the radiographic image conversion panel can be conducted by obtaining information regarding the manufacturing date of the radiographic image conversion panel, the version of the radiographic image conversion panel, fading information or the material constituting the radiographic image conversion panel as the information regarding the radiographic image conversion panel, the radiographic image information more suitable for diagnosis can be obtained.

(3) A radiographic image reading method of reading a radiographic image on a radiographic image conversion panel and for obtaining radiographic image information; comprising steps of:
   reading panel discriminating information corresponding to the radiographic image conversion panel, thereby obtaining information regarding the radiographic image conversion panel; and
   warning information regarding time limit for use of the radiographic image conversion panel.

(4) A radiographic image reading apparatus, comprising:
   image reading means for reading a radiographic image on a radiographic image conversion panel and for obtaining radiographic image information;
   discriminating information reading means for reading panel discriminating information corresponding to the radiographic image conversion panel and for obtaining information regarding the radiographic image conversion panel; and
   warning means for warning information regarding time limit for use of the radiographic image conversion panel.

With the invention described in Items (3) and (4), the image deterioration caused by the use of the radiographic image conversion panel whose time limit for use is terminated can be refrained, the radiographic image information more suitable for diagnosis can be obtained.

(5) A radiographic image conversion panel for storing a radiographic image, comprising:
   a panel discriminating section provided with panel discriminating information regarding the manufacturing date of the radiographic image conversion panel, the version of the radiographic image conversion panel, fading information or the material constituting the radiographic image conversion panel.

(6) A cassette in which a radiographic image conversion panel for storing a radiographic image is accommodated, comprising:

an accommodating section in which the radiographic image conversion panel for storing a radiographic image is accommodated; and a panel discriminating section provided with panel discriminating information regarding the manufacturing date of the radiographic image conversion panel, the version of the radiographic image conversion panel, fading information or the material constituting the radiographic image conversion panel.

With the invention described in Items (5) and (6), since image processing can be applied in accordance with a radiographic image conversion panel, the radiographic image information more suitable for diagnosis can be obtained.

(7) A radiographic image reading method, comprising, steps of:

reading panel discriminating information corresponding to the radiographic image conversion panel, thereby obtaining information regarding the radiographic image conversion panel;

obtaining a reading condition to read radiographic image information stored in the radiographic image conversion panel on the basis of the information regarding the radiographic image conversion panel; and reading the radiographic image-information stored in the radiographic image conversion panel on the basis of the reading condition.

(8) A radiographic image reading apparatus, comprising:

image reading means for reading a radiographic image on a radiographic image conversion panel and for obtaining radiographic image information;

panel discriminating information reading means for reading panel discriminating information corresponding to the radiographic image conversion panel and for obtaining information regarding the radiographic image conversion panel; and reading condition determining means for obtaining a reading condition to read radiographic image information stored in the radiographic image conversion panel on the basis of the information regarding the radiographic image conversion panel.

With the invention described in Items (7) and (8), since an image on a radiographic image conversion panel can be read on the condition corresponding to the radiographic image conversion panel, the radiographic image information more suitable for diagnosis can be obtained.

(9) A radiographic image reading method of reading a radiographic image on a radiographic image conversion panel and for obtaining radiographic image information; comprising steps of:

reading panel discriminating information corresponding to the radiographic image conversion panel, thereby obtaining information regarding the radiographic image conversion panel; and eliminating a remaining image on the radiographic image conversion panel on the basis of the information regarding the radiographic image conversion panel.

(10) A radiographic image reading apparatus, comprising:

image reading means for reading a radiographic image on a radiographic image conversion panel and for obtaining radiographic image information;

panel discriminating information reading means for reading panel discriminating information corresponding to the radiographic image conversion panel and for obtaining information regarding the radiographic image conversion panel; and eliminating means for eliminating a remaining image on the radiographic image conversion panel on the basis of the information regarding the radiographic image conversion panel.

With the invention described in Items (9) and (10), since noise remaining after an image on the radiographic image conversion panel is read can be eliminated on the eliminating condition corresponding to the radiographic image conversion panel, the radiographic image information on the radiographic image conversion panel photographed after the eliminating operation can be obtained as an image more suitable for diagnosis.

DETAILED DESCRIPTION OF THE PREFERRED EMBODIMENT

Next, embodiments of the invention will be explained as follows with reference to drawings.

(First Embodiment)

Figure 1:
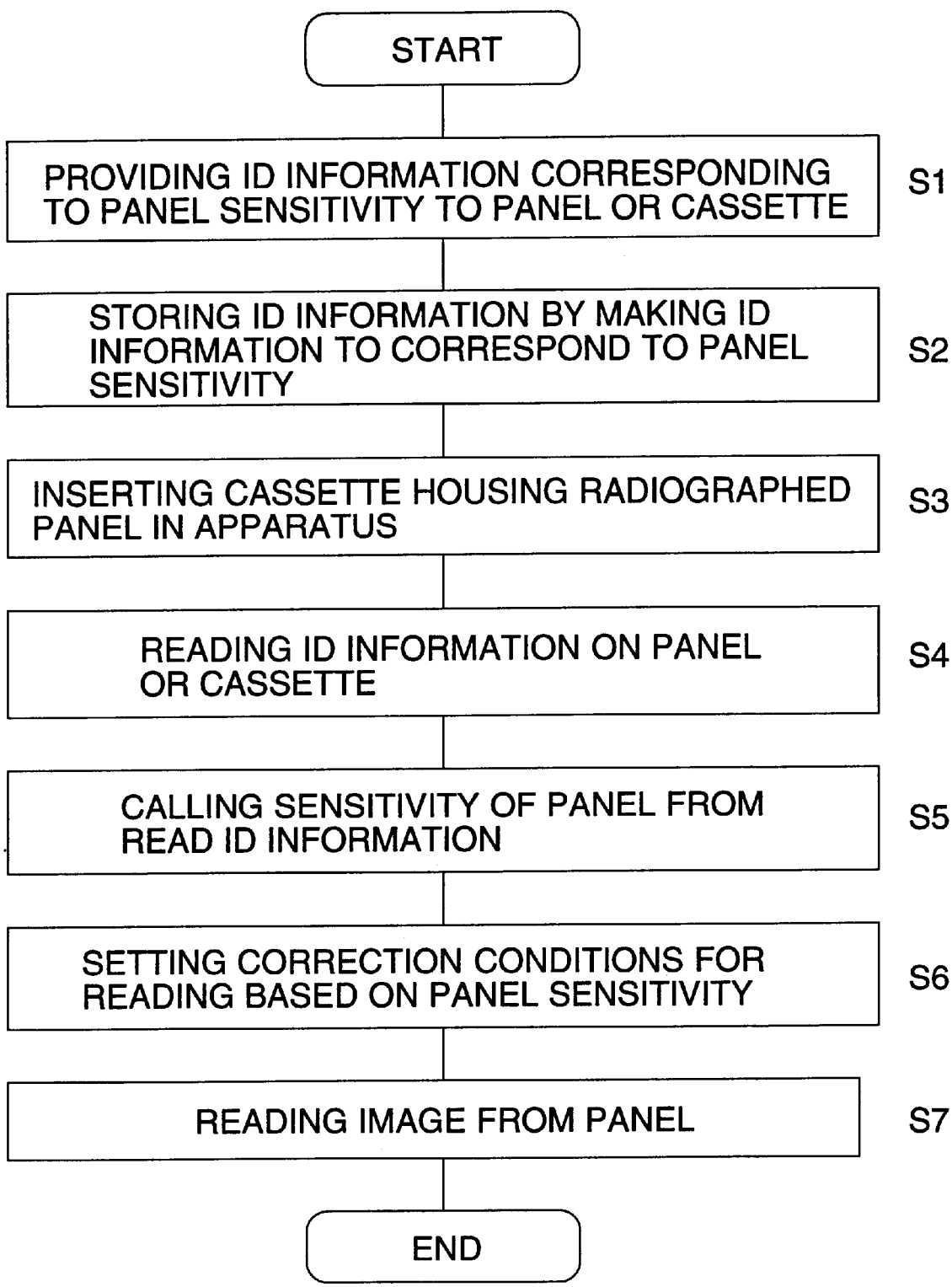
FIG. 1 is a flow chart showing how the radiographic image is read in the first embodiment of the invention.
Figure 2:
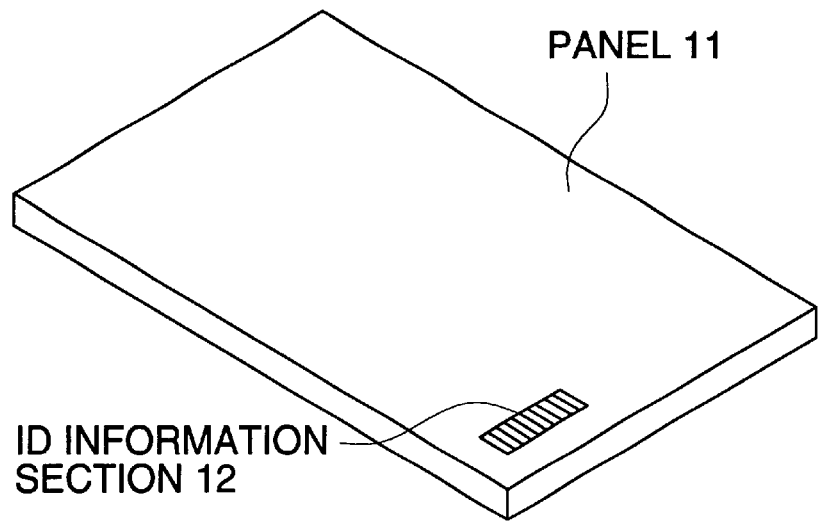
FIGS. 2(a) and 2(b) each is an illustration showing how the panel discriminating information used in the embodiment of the invention is provided.
Figure 2:
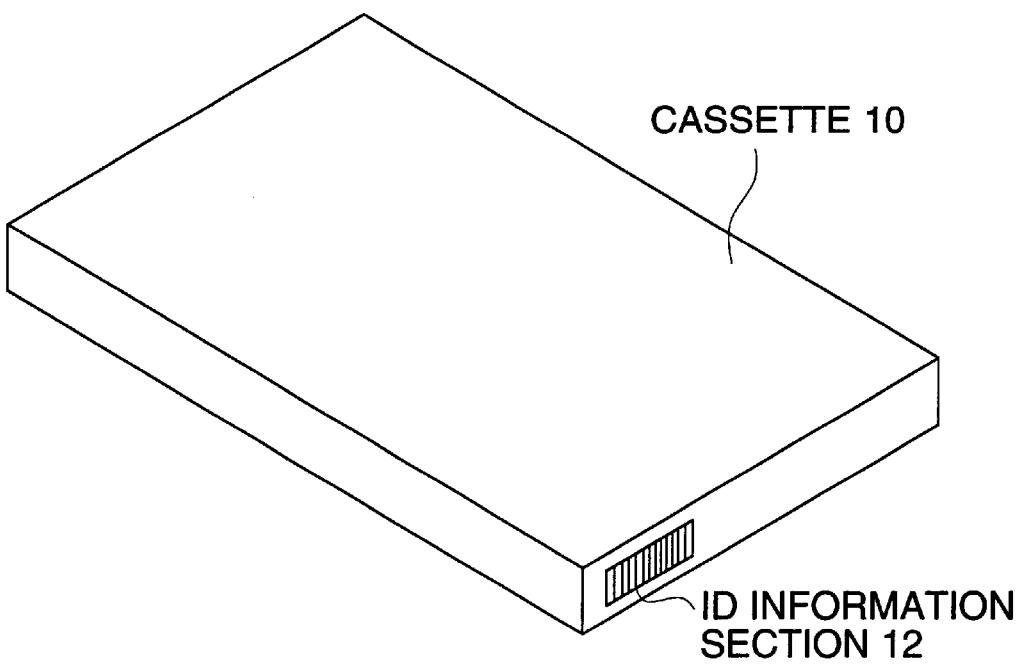

FIG. 1 is a flow chart showing procedures of the radiographic image reading method in the first embodiment of the invention. FIG. 2 is an illustration showing how the panel discriminating information is provided in the embodiment of the invention, and each of FIGS. 3 and 4 is a structure diagram showing an example of a radiographic image reading apparatus in the embodiment of the invention or of an apparatus conducting a radiographic image reading method in each embodiment of the invention.

Figure 3:
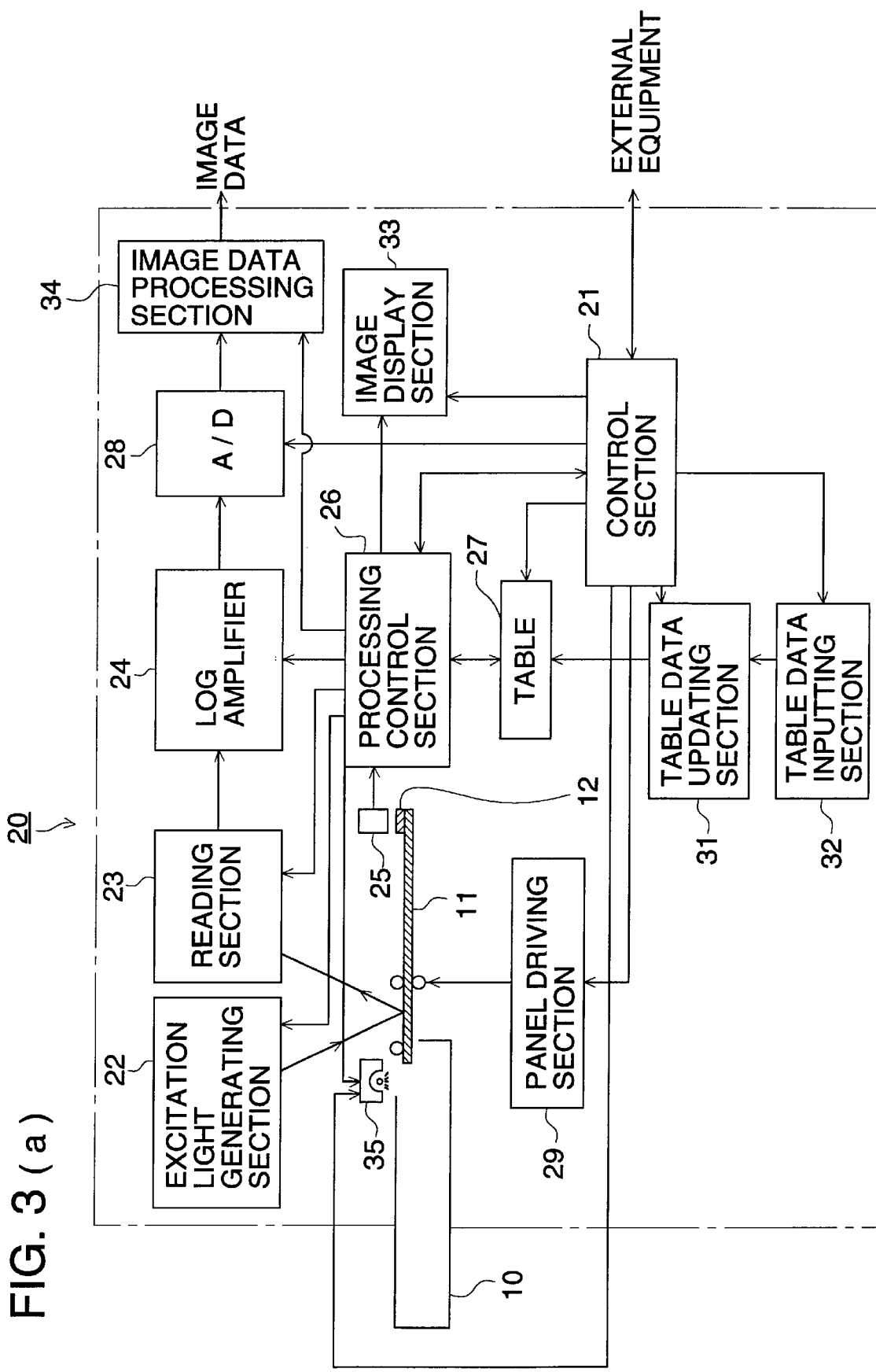
FIGS. 3(a) and 3(b) are structure diagrams showing the structure of a radiographic image reading apparatus used in the first embodiment of the invention.
Figure 4:
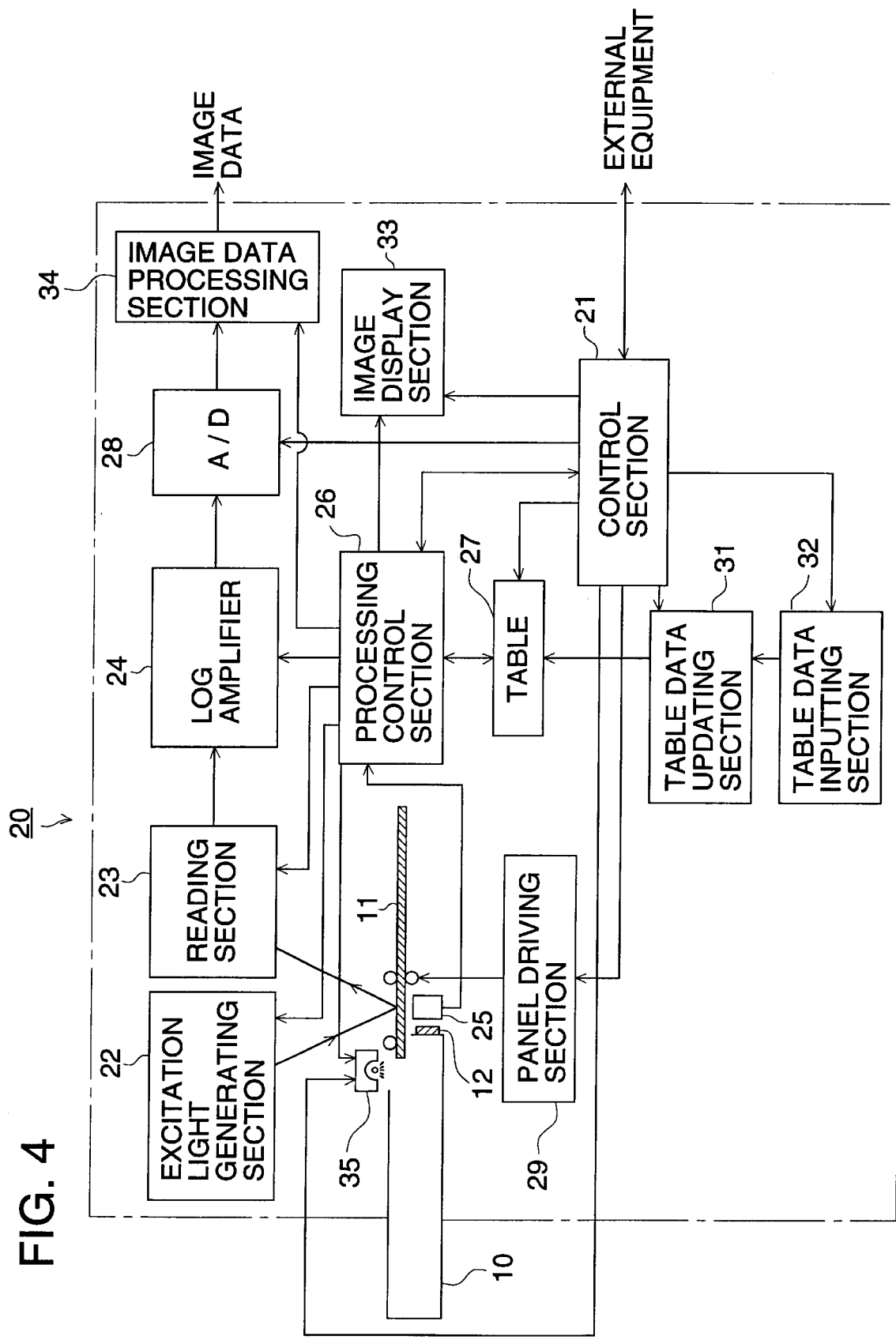
FIG. 4 is a structure diagram showing the structure of a radiographic image reading apparatus used in the first embodiment of the invention.

In FIGS. 3 and 4, cassette 10 houses plural panels (radiographic image conversion panel) 11, and the cassette 10 is inserted in a radiographing apparatus which is not shown in the drawing or in radiographic image reading apparatus 20 for conducting radiographing and reading.

Incidentally, in the present embodiment, there is explained an example wherein a radiographic image conversion panel is used as a radiographic image conversion means, and the radiographic image conversion panel is represented not only by a stimulative phosphor plate but also by a semiconductor detector.

Panel discriminating information corresponding to sensitivity of panel 11 is to be provided to each panel 11 as ID information section 12 as shown in FIG. 2(a), or panel discriminating information corresponding to sensitivity of panel 11 is to be provided to each cassette 10 housing therein plural panels 11 as ID information section 12 as shown in FIG. 2(b).

The ID information section 12 is represented by those wherein panel numbers, version information of the panel, sensitivity information of the panel, fading characteristics, and individual ID information of the panel are recorded on an information recording medium such as bar codes, magnetic stripes or IC memories.

Radiographic image reading apparatus 20 is one to read radiographic images and to prepare image data by reading radiographic image information formed on panel 11 through irradiation of radioactive rays transmitted through a subject.

Control section 21 is a control means to control operations of each section of the radiographic image reading apparatus 20, and it conducts operation control concerning reading in accordance with inputted command from an unillustrated operation part or with a built-in operation control program.

The reading means is provided with excitation light generating section 22 which generates an excitation light such as a laser beam in the state of scanning and with reading section 23 which collects stimulated emission light on panel 11 to conduct photoelectric transfer.

The reading means is further provided with LOG amplifier 24 which voltage-amplifies an output (analog image signals) of the reading section 23 with prescribed characteristics and with A/D converter 28 which converts analog image signals into digital image data and outputs them as image data. There is further arranged driving section 29 which drives panel 11 at constant speed during reading under the control of the control section 21.

When ID information section 12 is provided on panel 11 as panel discriminating information as shown in FIG. 2(a), discriminating information reading means 25 such as a sensor for reading the ID information section 12 is arranged at the position corresponding to the panel 11 (FIG. 3).

When ID information section 12 is provided on cassette 10 as panel discriminating information as shown in FIG. 2(b), discriminating information reading means 25 such as a sensor for reading the ID information section 12 is arranged at the position corresponding to the cassette 10 (FIG. 4).

Further, there are provided table 27 representing a storage means that stores, as a table, data of correspondence between panel discriminating information and panel information such as panel version, date of manufacture of panel, panel materials (semiconductor material, phosphor types), panel erasability, panel fading characteristics and panel sensitivity, and processing control section 26 that reads out information of panel 11 from the results of detection by discriminating information reading means 25 and from the table stored in table 27.

Incidentally, correspondence data between panel discriminating information and panel sensitivity are stored in the table 27, and an absolute value of sensitivity or a relative value of sensitivity (relative sensitivity for version 1.0) is stored as panel sensitivity. When an absolute value for sensitivity of panel 11 is recorded on ID information section 12, it is also possible to omit the table 27 as shown in FIG. 3'. When material of panel 11 is stored in ID information section 12, data corresponding to panel materials, panel sensitivity and panel erasability are stored in the table. In the same manner, panel information such as panel version, date of manufacture of panel, panel material, panel erasability, panel fading characteristics and panel sensitivity may be stored in ID information section 12 as panel discriminating information, and in that case, table 27 can be omitted. It is further possible to store panel numbers in ID information section 12 as panel discriminating information and to store in table 11 panel numbers, panel versions, dates of manufacture of panel, panel materials, panel erasability, fading characteristics of panel and panel sensitivity so that they may be corresponded.

Now, operations in the present embodiment will be explained as follows, referring to the flow chart in FIG. 1, with an example to correct panel sensitivity. First, panel discriminating information (ID information) based on sensitivity of panel 11 or on version is provided to cassette 10 housing panel 11 or to panel 11 (FIG. 1 Sl)

When providing panel discriminating information to panel 11, a prescribed area which is outside the image forming area is determined to be ID information section 12 (see FIG. 2(a)), and a medium such as a bar code, a magnetic tape or a memory is pasted on the area so that panel discriminating information may be stored in the medium.

When providing discriminating information to cassette 10, an area in the position which makes it easy to read when the cassette is inserted in radiographic image reading apparatus 20 is determined to be ID information section 12 (see FIG. 2(b)), and a medium such as a bar code, a magnetic tape or a memory is pasted on the area so that panel discriminating information may be stored in the medium.

In synchronization with this, a table wherein panel discriminating information is corresponded to panel sensitivity is stored in table 27 of radiographic image reading apparatus 20 as ID information (see FIG. 1 S2).

Panel discriminating information to be provided in this case includes information of an absolute value of panel sensitivity, a sign corresponding to an absolute value of panel sensitivity, information of panel version, date of manufacture of panel and panel materials. In the table 27, information of panel sensitivity corresponding to the panel discriminating information stated above (sensitivity change (relative sensitivity) for basic version, and sensitivity corresponding to the aforesaid sign) is stored.

Radiographing is conducted by the use of panel 11 or cassette 10 prepared as in the foregoing, and the cassette 10 housing therein exposed panels is inserted in radiographic image reading apparatus 20 for conducting reading (FIG. 1 S3).

In the radiographic image reading apparatus 20 into which the cassette 10 is inserted, panel discriminating information on ID information section 12 on panel 11 or cassette 10 is read by discriminating information reading means 25 in the course of reading (FIG. 1 S4).

With regard to the panel discriminating information read by the discriminating information reading means 25, processing control section 26 calls sensitivity of panel 11, referring to table 27 (FIG. 1 S5). When sensitivity information of panel 11 is recorded on ID information section 12, the information is used as it is, while when version information of the panel and signs corresponding to sensitivity are recorded, sensitivity of panel 11 is called with reference to table 27.

In accordance with sensitivity of panel 11 thus called, reading conditions for reading radiographic image information accumulated in the panel 11 are set so that the conditions may be changed to initial values (FIG. 1 S6).

Incidentally, the correction for the reading conditions includes gain adjustment of a photomultiplier tube of reading section 23 and adjustment of amplification factor of LOG amplifier 24 both carried out through control of the reading section 23 and the LOG amplifier 24 conducted by the processing control section. The correction and adjustment mentioned above are conducted so that a difference in signal values of radiographic image information caused by a difference in sensitivity of panel 11 may be canceled.

In this case, when gain adjustment is conducted on a photomultiplier tube, it is possible to make the distribution of signal values of panel 11 and a readable range for the photomultiplier tube to match each other, and thereby to use a dynamic range of the photomultiplier tube effectively, which is an advantageous point.

Under the state that the reading conditions are set as in the foregoing, reading of radiographic image information of panel 11 is conducted by excitation light generating section 22 and reading section 23 (FIG. 1 S7). This reading makes it possible to obtain the constant signal value for the constant dose of X-rays independently of sensitivity of the radiographic image conversion panel. The foregoing is a method for correcting sensitivity prior to reading radiographic image information, and it is also possible to correct sensitivity through the method wherein the aforesaid S6 is omitted, then reading is conducted in S7, and after that, the radiographic image information thus read is corrected. In this case, S4 and S5 may also be conducted after completion of S6.

Namely, in the case of the reading mentioned above, it does not happen that signal values are changed by a difference in sensitivity of radiographic image conversion panels. As a result, a level of the dose of irradiation can easily be judged and controlled. Further, a quantity of radioactive rays can easily be controlled, and thereby it does not happen that a patient is exposed to excessive radioactive rays.

In addition, even when radiographing for plural sheets under the condition that radiographic image conversion panels each having different sensitivity are present as a mixture to be used, it is possible to obtain radiographic images each having the same signal value when radiographing the same subject using the same quantity of X-rays. Therefore, a correct diagnosis can be made. In the same way as in the present embodiment, it is further possible to correct reading conditions resulting from fading characteristics and panel materials other than sensitivity.

When correcting fading characteristics, gain of reading section 23 or gain of LOG amplifier 24 is adjusted in accordance with fading characteristics, or light intensity of excitation light generating section 22 is adjusted in accordance with fading characteristics.

In the case of correction of reading conditions resulting from panel materials, sensitivity can be corrected through the present embodiment, and when an excitation wavelength varies depending on the kinds of materials, the excitation wavelength of the excitation light generating section 22 is changed for the correction. A method to change an excitation wavelength includes a method to employ a wavelength conversion element and a method provided with an excitation light generating section for plural wavelengths both of which can be selected in accordance with panel materials.

Next, there will be explained a method to update data in the table.

A table data inputting section 32 as a table data inputting means capable of inputting data wherein panel discriminating information and information concerning panels are made to correspond to each other, and a table data updating section 31 as a table data updating means which inputs table data inputted from the table data inputting means in table 27 and updates data in table are provided. By providing these, it is possible to make the aforesaid correction even when reading radiographic image information of a new panel which is not stored in the table.

As a table data inputting means, it is possible to use a driver which reads a storage medium such as a key board or a floppy disk. Further, a receiving means capable of receiving table data through telephone lines can save the time required for a user to input table data.

(Second Embodiment)

Figure 5:
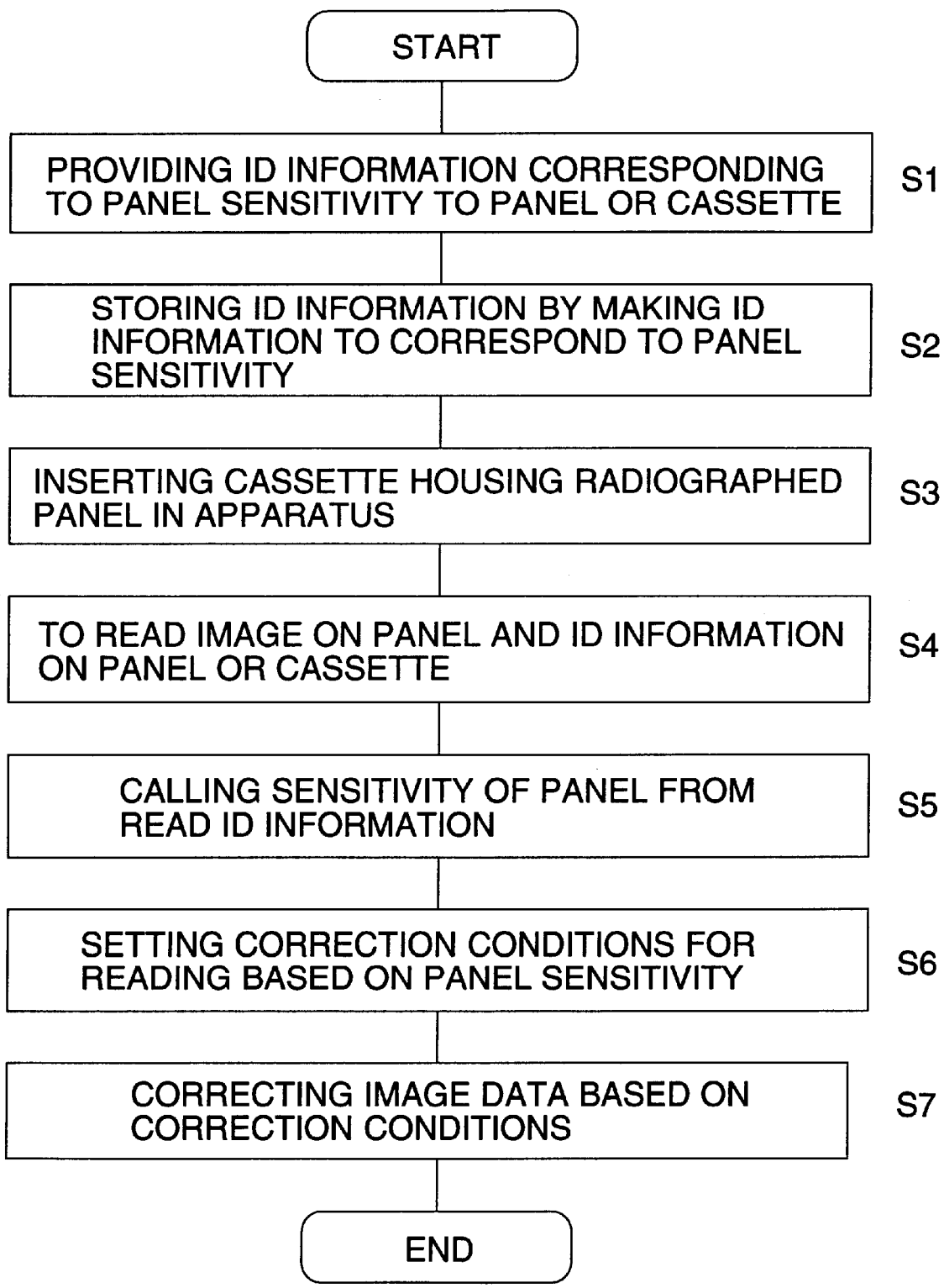
FIG. 5 is a flow chart showing how the radiographic image is read in the second embodiment of the invention.

FIG. 5 is a flow chart showing procedures of a radiographic image reading method in the second embodiment of the invention. Each of FIGS. 6 and 7 is a structure diagram showing an example of a radiographic image reading apparatus in the second embodiment of the invention or an apparatus executing a radiographic image reading method in the second embodiment of the invention.

Figure 6:
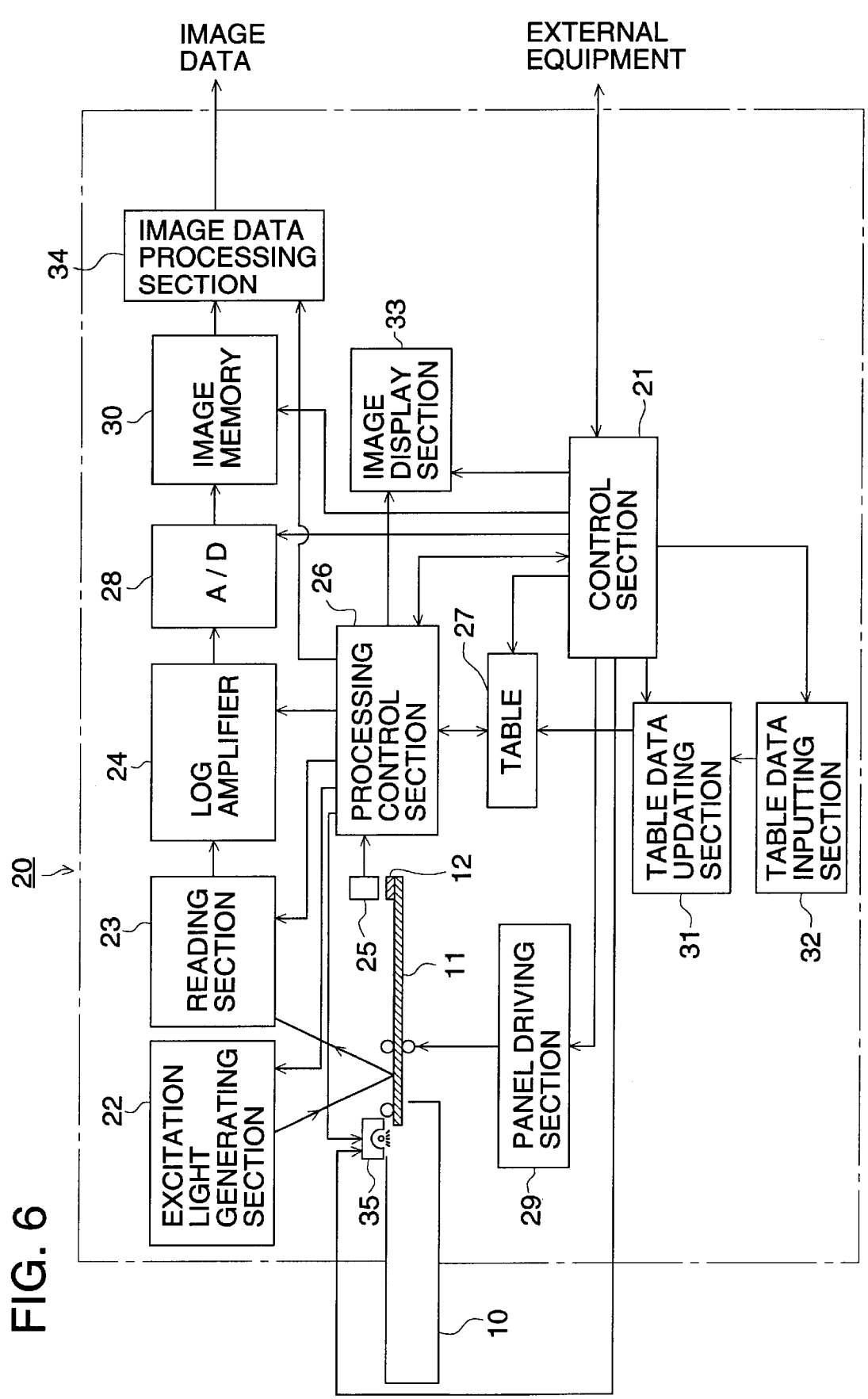
FIG. 6 is a structure diagram showing the structure of a radiographic image reading apparatus used in the second embodiment of the invention.
Figure 7:
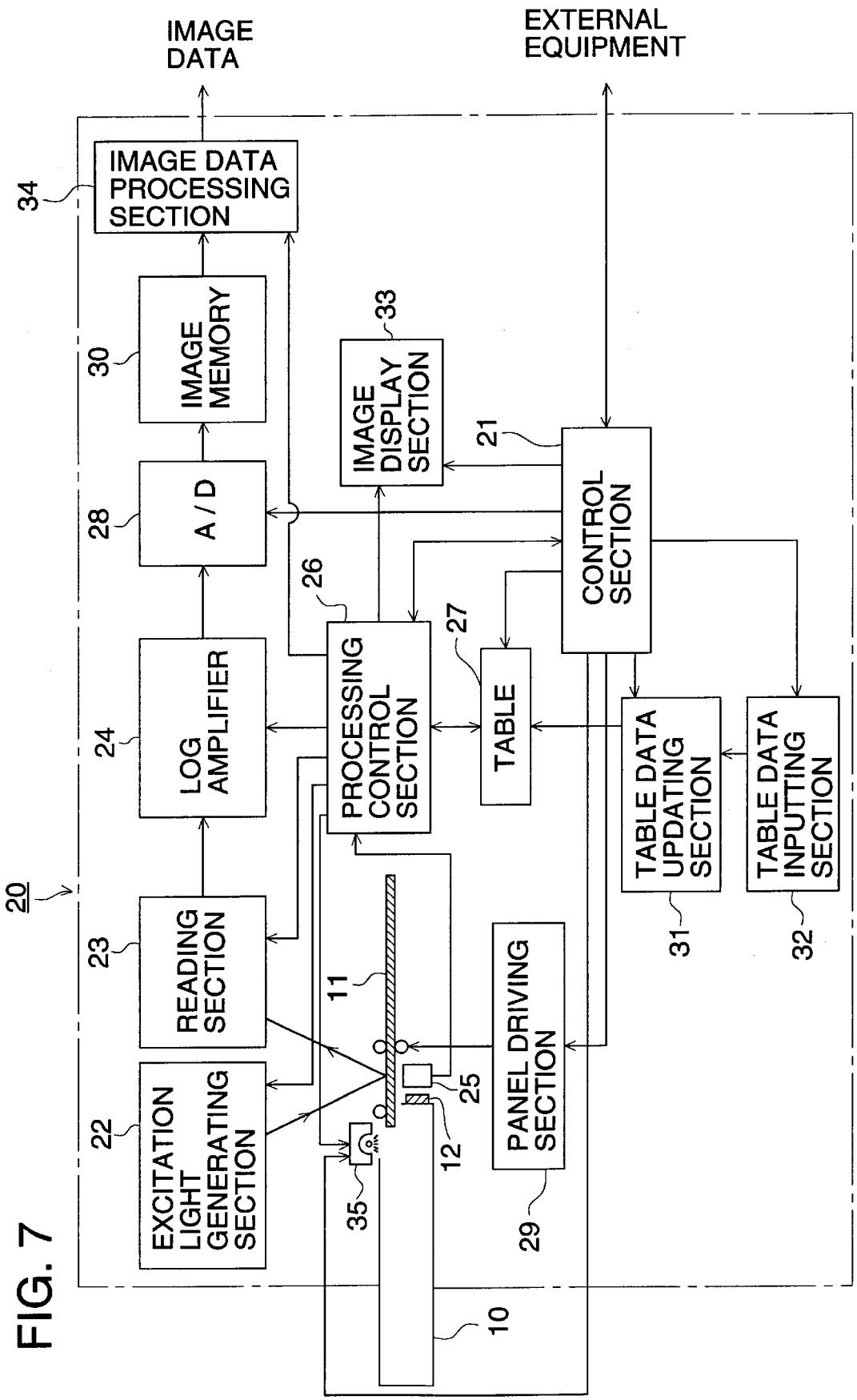
FIG. 7 is a structure diagram showing the structure of a radiographic image reading apparatus used in the second embodiment of the invention.

In FIGS. 6 and 7, items identical to those in FIGS. 3 and 4 are given the same numbers as the numbers in FIGS. 3 and 4, and explanation for them will be omitted here. The point of FIGS. 6 and 7 which is different from that in FIGS. 3 and 4 is that there is provided image memory 30 which temporarily stores radiographic image information as image data, wherein the image data are corrected by control section 21.

Operations in the present embodiment will be explained here with reference to the flow chart in FIG. 5. First, panel discriminating information (ID information) corresponding to sensitivity or version of panel 11 is provided to cassette 10 housing panel 11 or to panel 11 (FIG. 5 S1).

When providing panel discriminating information to panel 11, a prescribed area which is outside the image forming area is determined to be ID information section 12 (see FIG. 2(a)), and a medium such as a bar code, a magnetic tape or a memory is pasted on the area so that panel discriminating information may be stored in the medium. When providing discriminating information to cassette 10, an area in the position which makes it easy to read when the cassette is inserted in radiographic image reading apparatus 20 is determined to be ID information section 12 (see FIG. 2(b)), and a medium such as a bar code, a magnetic tape or a memory is pasted on the area so that panel discriminating information may be stored in the medium.

In synchronization with this, a table wherein panel discriminating information is corresponded to panel sensitivity is stored in table 27 of radiographic image reading apparatus 20 as ID information (see FIG. 5 S2).

Panel discriminating information to be provided in this case includes information of an absolute value of panel sensitivity, a sign corresponding to an absolute value of panel sensitivity and information of panel version. In the table 27, information of panel sensitivity corresponding to the panel discriminating information stated above (sensitivity change (relative sensitivity) for basic version, and sensitivity corresponding to the aforesaid sign) is stored.

Radiographing is conducted by the use of panel 11 or cassette 10 prepared as in the foregoing, and the cassette 10 housing therein exposed panels is inserted in radiographic image reading apparatus 20 for conducting reading (FIG. 5 S3).

In the radiographic image reading apparatus 20 into which the cassette 10 is inserted, radiographic image information of panel 11 is read by excitation light generating section 22 and reading section 23, and panel discriminating information on ID information section 12 on panel 11 or cassette 10 is read by discriminating information reading means 25 (FIG. 5 S4). In this case, the radiographic image information thus read is stored in image memory 30 as image data.

With regard to the panel discriminating information read by the discriminating information reading means 25, sensitivity processing section 26 calls sensitivity of panel 11, referring to table 27 (FIG. 5 S5). When sensitivity information of panel 11 is recorded on ID information section 12, the information is used as it is, while when version information of the panel and signs corresponding to sensitivity are recorded, sensitivity of panel 11 is called with reference to table 27.

In accordance with sensitivity of panel 11 thus called, conditions under which the radiographic image information stored in image memory 30 is subjected to image processing are set (FIG. 5 S6).

Incidentally, the correcting conditions in image processing include various conditions to cancel a difference in signal values of radiographic image information caused by a difference in sensitivity of panel 11.

Under the state wherein correcting conditions in image processing are set as stated above, image data stored in image memory 30 are subjected to image processing conducted by an image data processing section 34 (FIG. 5 S7). This image processing makes it possible to obtain image data with the constant signal value for the constant dose of X-rays independently of sensitivity of the radiographic image conversion panel.

Namely, when the reading and the image processing mentioned above are conducted, it does not happen that a signal value is changed by a difference in sensitivity of the radiographic image conversion panels. As a result, a level of the dose of irradiation can easily be judged and controlled.

In addition, even when radiographing for plural sheets under the condition that radiographic image conversion panels each having different sensitivity are present as a mixture to be used, it is possible to obtain radiographic images each having the same signal value when radiographing the same subject using the same quantity of X-rays. Therefore, a correct diagnosis can be made. In addition to the aforesaid correction of sensitivity, reading conditions resulting from fading characteristics and panel materials can also be corrected.

(Third Embodiment)

When panel 11 is represented by a stimulating phosphor panel, the erasing section 35 shown in FIG. 3 is driven by control section 21 to erase noises remaining on panel 11, after radiographic image information has been read. In that case, processing control section 26 reads erasing conditions which are stored in table 27 to correspond to panel discriminating information, based on panel discriminating information on panel 11, and it controls the erasing section so that erasing can be conducted based on the erasing conditions. As an erasing condition, there is used a parameter which changes erasing light quantity including erasing time and intensity of erasing light. Incidentally, in table 27, either absolute values of erasing conditions or relative values for the standard erasing conditions may be stored, similarly to information relating to sensitivity in another embodiment.

When absolute values of erasing conditions are stored in ID information section 12 as panel discriminating information, table 27 may be omitted as shown in FIG. 4.

(Fourth Embodiment)

An image display section 33 in FIG. 3 is a warning means for displaying an expiration date of panel 11 or for warning that the expiration date of panel 11 is over. Processing control section 26 reads out a date of manufacture or an expiration date of panel 11 stored in table 27 in a way to correspond to panel discriminating information, based on the panel discriminating information of the panel 11. When the date of manufacture is read out, the processing control section calculates an expiration date from the date of manufacture. Then, the processing control section displays the expiration date on an image display section. When it is realized from the expiration date and a current date that the term of validity has expired, the expiration of the term of validity may be displayed on the image display section. It is also possible to provide a means to give warning orally for the expiration of the valid term, in place of the image display section.

When an expiration date is stored in ID information section 12 as panel discriminating information, the table 27 can be omitted as shown in FIG. 4.

(Fifth Embodiment)

Figure 8:
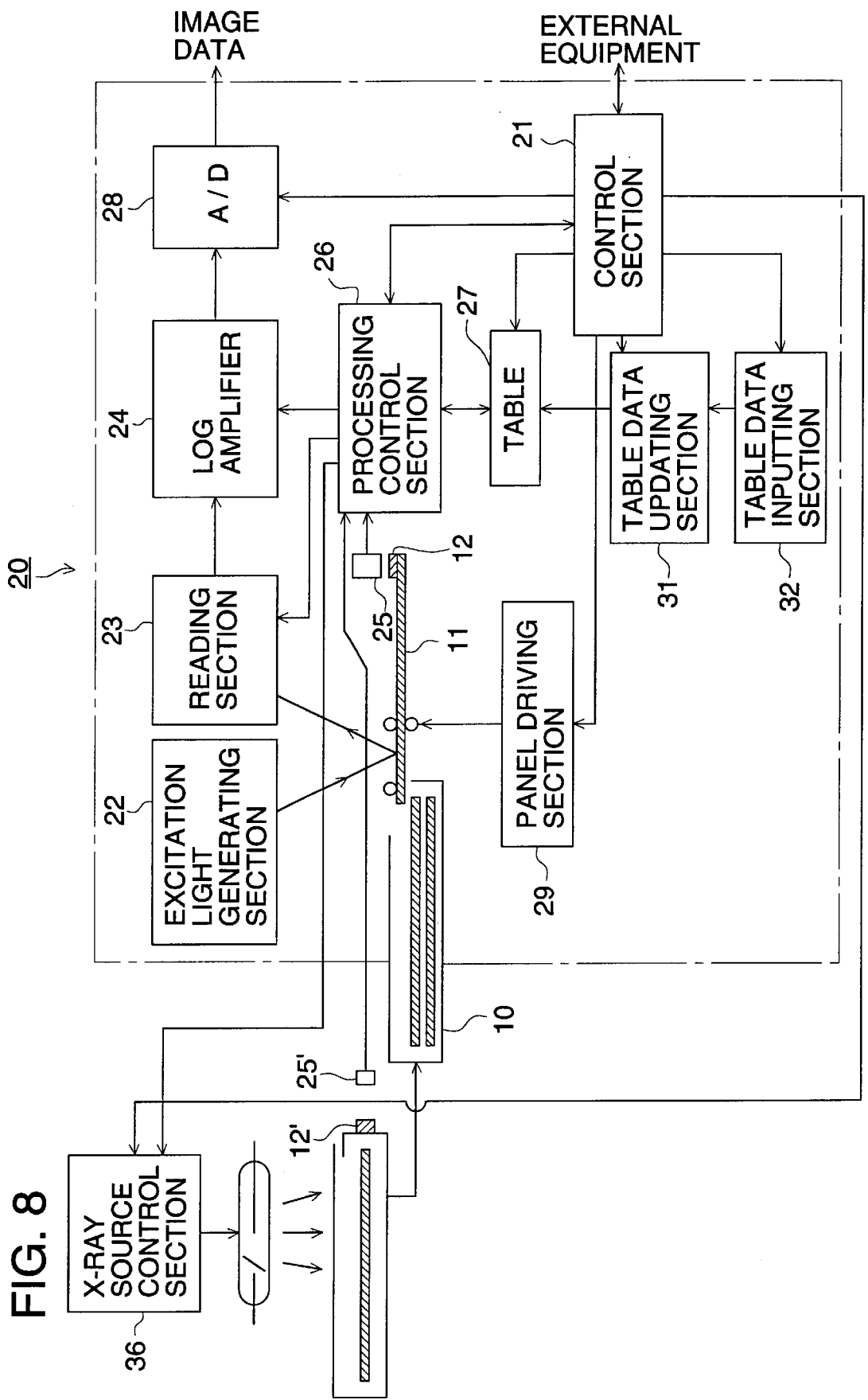
FIG. 8 is a structure diagram showing the structure to control a X-ray source on the basis of the panel discriminating information.

FIG. 8 shows an occasion where a radiation exposure device is controlled based on panel discriminating information.

Only difference between FIG. 8 and FIG. 3 will be explained.

Discriminating information reading section 25 reads ID information section before panel 11 is exposed to radiation. Then, processing control section 26 reads out radiation exposure conditions representing photographing conditions stored in table 26 to correspond to panel discriminating information, based on the read panel discriminating information. Based on the radiation exposure conditions thus read out, the processing control section 26 controls an X-ray source control section 36 of the radiation exposure device so that radiation may be irradiated. As radiation exposure conditions, a quantity of light of radiation and an absolute value of a quantity of light of radiation are used, and as a quantity of light of radiation, irradiation intensity and irradiation time are used. When absolute values of radiation exposure conditions are stored in ID information section 12 as panel discriminating information, table 27 may be omitted as shown in FIG. 4.

As stated above, since photographing can be conducted on the condition corresponding to the radiographic image conversion panel on the basis of the panel discriminating information, radiographic image information on the radiographic image conversion panel obtained by the photographing becomes information in which image quality irregularities due to the difference among the radiographic image conversion panels are reduced so that the information becomes more suitable for diagnosis.

(Sixth Embodiment)

In the first embodiment, or in the fifth embodiment stated above, sensor 25 is arranged inside a cassette-insertion opening provided on radiographic image reading apparatus 20. In contrast with this, a handy scanner representing the sensor 25 is used, and after an operator uses the handy scanner to read panel discriminating information, a cassette can be inserted in radiographic image reading apparatus 20.

With the structure mentioned above, it is possible to use easily in the existing radiographic image reading apparatus by connecting the handy scanner to an input/output port and by correcting reading conditions and image processing with an operation program of control section (CPU) 21.

(Seventh Embodiment)

In each embodiment stated above, when a plurality of radiographic image reading apparatuses are arranged through network connection, panel discriminating information can be shared by controlling table 27 with a server. By doing this, common panel discriminating information can be utilized, and panel discriminating information can be updated surely.

(Eighth Embodiment)

In the case of a radiographic image radiographing/reading apparatus having therein plural panels 11, it is possible to carry out the foregoing by providing panel discriminating information such as panel ID to each panel 11 (see FIG. 2(a)), and by conducting sensitivity correction in reading and image data correction in the same way as in the aforesaid embodiment.

Even in the case of an apparatus having therein built-in panels, when radiographing for plural sheets under the condition that radiographic image conversion panels each having different sensitivity are present as a mixture to be used, it is possible to obtain radiographic images each having the same signal value when radiographing the same subject using the same quantity of X-rays. Therefore, a correct diagnosis can be made.

(Ninth Embodiment)

Even in the case of a radiographic image radiographing/reading apparatus having therein one sheet of panels 11, it is possible to carry out the foregoing by providing panel discriminating information such as panel ID to the panel 11 (see FIG. 2(a)), and by conducting sensitivity correction in reading and image data correction in the same way as in the aforesaid embodiment.

In this case, it is also possible to update table 27 by the use of a floppy disk packed together with a panel when panel 11 is replaced, without providing ID information section 12 on panel 11.

Even in the case of an apparatus having therein a built-in panel, when radiographic image conversion panels each having different sensitivity are used, it is possible to obtain radiographic images each having the same signal value when radiographing the same subject using the same quantity of X-rays. Therefore, a correct diagnosis can be made.

As explained in detail above, the invention described hereupon provides the effects described in Items (1) to (10).

In addition to Items (1) to (10) stated above, the objective of the present invention can be attained by the following Items as the preferable embodiment.

(11) A radiographic image reading method for reading a radiographic image conversion panel, wherein panel discriminating information provided to the radiographic image conversion panel in accordance with its sensitivity is read, then reading sensitivity is corrected based on the panel discriminating information, and radiographic image information is read from the radiographic image conversion panel.

In this radiographic image reading method, it is possible to obtain the constant signal value for the constant dose of X-rays independently of sensitivity of the radiographic image conversion panel, because radiographic image information is read from the radiographic image conversion panel after the reading sensitivity is corrected based on the panel discriminating information.

(12) A radiographic image reading method for reading a radiographic image conversion panel, wherein radiographic image information on a radiographic image conversion panel which is provided with panel discriminating information corresponding to sensitivity of the panel is read, and concurrently with that, the panel discriminating information is read, and the radiographic image information thus read is corrected based on the aforesaid panel discriminating information.

In this radiographic image reading method, it is possible to obtain the constant signal value for the constant dose of X-rays independently of sensitivity of the radiographic image conversion panel, because radiographic image information read is corrected based on the panel discriminating information.

(13) In the methods (11) and (12) above, panel discriminating information provided to the radiographic image conversion panel is read.

In the radiographic image reading method, correction of sensitivity or correction of image information is conducted based on the panel discriminating information provided to the radiographic image conversion panel. It is therefore possible to obtain the constant signal value for the constant dose of X-rays independently of sensitivity of the radiographic image conversion panel.

(14) In the methods (11) and (12) above, panel discriminating information provided to a cassette which houses the radiographic image conversion panel is read.

In the radiographic image reading method, it is possible to obtain the constant signal value for the constant dose of X-rays independently of sensitivity of the radiographic image conversion panel, because correction of sensitivity or correction of image information is conducted based on the panel discriminating information provided to the cassette which houses the radiographic image conversion panel.

(15) A radiographic image reading apparatus for reading a radiographic image conversion panel, wherein a radiographic image information reading means which reads radiographic image information accumulated on the radiographic image conversion panel, a panel discriminating information reading means which reads panel discriminating information provided to the radiographic image conversion panel in accordance with its sensitivity, a storing means in which correspondence data between panel discriminating information and sensitivity are stored, and a control means which controls reading sensitivity of the radiographic image information reading means based on sensitivity corresponding to panel discriminating information read by the panel discriminating information reading means, are provided.

In this radiographic image reading apparatus, radiographic image information is read from the radiographic image conversion panel after the reading sensitivity is corrected based on the panel discriminating information. It is therefore possible to obtain the constant signal value for the constant dose of X-rays independently of sensitivity of the radiographic image conversion panel.

(16) A radiographic image reading apparatus for reading a radiographic image conversion panel, wherein a radiographic image information reading means which reads radiographic image information accumulated on the radiographic image conversion panel, a panel discriminating information reading means which reads panel discriminating information provided to the radiographic image conversion panel in accordance with its sensitivity, a storing means in which correspondence data between panel discriminating information and sensitivity are stored, and an image processing means which corrects radiographic image information read by the radiographic image information reading means based on sensitivity corresponding to panel discriminating information read by the panel discriminating information reading means.

In this radiographic image reading apparatus, it is possible to obtain the constant signal value for the constant dose of X-rays independently of sensitivity of the radiographic image conversion panel, because radiographic image information read is corrected based on panel discriminating information.

(17) Structures (15) and (16) above, wherein the panel discriminating information reading means reads panel discriminating information provided to the radiographic image conversion panel.

In this radiographic image reading apparatus, it is possible to obtain the constant signal value for the constant dose of X-rays independently of sensitivity of the radiographic image conversion panel, because correction of sensitivity or correction of image information is conducted after reading panel discriminating information provided to the radiographic image conversion panel.

(18) Structures (15) and (16) above, wherein the panel discriminating information reading means reads panel discriminating information provided to a cassette which houses the radiographic image conversion panel.

In this radiographic image reading apparatus, it is possible to obtain the constant signal value for the constant dose of X-rays independently of sensitivity of the radiographic image conversion panel, because correction of sensitivity or correction of image information is conducted after reading panel discriminating information provided to the cassette that houses the radiographic image conversion panel.

What is claimed is:

1. A radiographic image reading method for reading a radiographic image on a radiographic image conversion panel and for obtaining radiographic image information, the radiographic image corresponding to a body part which is formed on the radiographic image conversion panel due to the exposure of radioactive rays, which have passed through the body and have different intensities, upon the radiographic image conversion panel, the method comprising the steps of:
    reading panel discriminating information corresponding to the radiographic image conversion panel, thereby obtaining information regarding the radiographic conversion panel; and
    providing warning information regarding a time limit for use of the radiographic image conversion panel on the basis of the information regarding the radiographic image conversion panel.

2. The radiographic image reading method of claim 1, wherein the warning step conducts indicating the information regarding time limit for use of the radiographic image conversion panel.

3. The radiographic image reading method of claim 1, wherein the warning step warns the time limit for use of the radiographic image conversion panel or the termination of time for use of the radiographic image conversion panel.

4. The radiographic image reading method of claim 1, wherein the warning step includes a step of obtaining the time limit for use of the radiographic image conversion panel on the basis of the information regarding the radiographic image conversion panel.

5. The radiographic image reading method of claim 1, wherein the reading step reads panel discriminating information provided on one of the radiographic image conversion panel and a cassette in which the radiographic image conversion panel is accommodated, thereby obtaining information regarding the radiographic image conversion panel.

6. A radiographic image reading apparatus, comprising:
    image reading means for reading a radiographic image on a radiographic image conversion panel and for obtaining radiographic image information, the radiographic image corresponding to a body part which is formed on the radiographic image conversion panel due to the application of radioactive rays having different intensities upon the radiographic image conversion panel;
    discriminating information reading means for reading panel discriminating information corresponding to the radiographic image conversion panel and for obtaining information regarding the radiographic conversion panel; and
    warning means for warning information regarding a time limit for use of the radiographic image conversion panel on the basis of the information regarding the radiographic image conversion panel.

7. The radiographic image reading apparatus of claim 6, further comprising a memory for memorizing the panel discriminating information with the correlation with the information regarding the radiographic image conversion panel.

8. The radiographic image reading apparatus of claim 6, further comprising
    time limit administrating means for obtaining information regarding time limit of the radiographic image conversion panel on the basis of the information regarding the radiographic image conversion panel.

9. The radiographic image reading apparatus of claim 6, wherein the warning means is image display means.

10. The radiographic image reading apparatus of claim 6, wherein the warning means warns the time limit for use of the radiographic image conversion panel or the termination of time for use of the radiographic image conversion panel.

11. The radiographic image reading apparatus of claim 6, wherein the discriminating information reading means reads panel discriminating information provided on one of the radiographic image conversion panel and a cassette in which the radiographic image conversion panel is accommodated.

12. The radiographic image reading apparatus of claim 6, wherein the information regarding the radiographic image conversion panel is the kind of phosphor constituting the radiographic image conversion panel.

13. A radiographic image reading method for reading a radiographic image on a radiographic image conversion panel and for obtaining radiographic image information, the method comprising steps of:
    reading panel discriminating information corresponding to the radiographic image conversion panel, thereby obtaining information regarding the radiographic image conversion panel;
    obtaining an eliminating condition for eliminating a remaining image on the radiographic image conversion panel on the basis of the information regarding the radiographic image conversion panel; and
    eliminating the remaining image on the radiographic image conversion panel on the basis of the eliminating condition after reading the radiographic image on the radiographic image conversion panel.

14. The radiographic image reading method of claim 13, wherein the step of obtaining the information regarding the radiographic image conversion panel obtains one of the manufacturing date of the radiographic image conversion panel, the version of the radiographic image conversion panel, and the material constituting the radiographic image conversion panel as the information regarding the radiographic image conversion panel.

15. The radiographic image reading method of claim 13 wherein the reading step reads panel discriminating information provided on one of the radiographic image conversion panel and a cassette in which the radiographic image conversion panel is accommodated, thereby obtaining information regarding the radiographic image conversion panel.

16. The radiographic image reading method of claim 13, wherein the step of obtaining the information regarding the radiographic image conversion panel obtains the kind of phosphor constituting the radiographic image conversion panel as the information regarding the radiographic image conversion panel.

17. The radiographic image reading method of claim 13, wherein the reading step reads the discriminating information provided on one of the radiographic image conversion panel and a cassette in which the radiographic image conversion panel is accommodated.

18. A radiographic image reading apparatus, comprising:
  image reading means for reading a radiographic image on a radiographic image conversion panel and for obtaining radiographic image information;
  panel discriminating information reading means for reading panel discriminating information corresponding to the radiographic image conversion panel, and for obtaining information regarding the radiographic image conversion panel;
  eliminating condition determining means for determining an eliminating condition for eliminating a remaining image on the radiographic image conversion panel on the basis of the information regarding the radiographic image conversion panel; and
  eliminating means for eliminating the remaining image on the radiographic image conversion panel on the basis of the eliminating condition on the basis of the eliminating condition after reading the radiographic image on the radiographic image conversion panel.

19. The radiographic image reading apparatus of claim 18, further comprising a memory for memorizing the panel discriminating information with the correlation with the information regarding the radiographic image conversion panel.

20. The radiographic image reading apparatus of claim 18, wherein the information regarding the radiographic image conversion panel is one of the manufacturing date of the radiographic image conversion panel, the version of the radiographic image conversion panel, and the material constituting the radiographic image conversion panel.

21. The radiographic image reading apparatus of claim 18, wherein the panel discriminating information reading means reads the discriminating information provided on one of the radiographic image conversion panel and a cassette in which the radiographic image conversion panel is accommodated.

22. The radiographic image reading apparatus of claim 18, wherein the information regarding the radiographic image conversion panel is the kind of phosphor constituting the radiographic image conversion panel.

* * * * *